Patented Dec. 26, 1950

2,535,034

UNITED STATES PATENT OFFICE 2,535,034

PRODUCTION OF SHEET MATERIAL FROM RUBBER

Bruce R. Billmeyer, Lancaster, Pa., assignor to Armstrong Cork Company, Lancaster, Pa., a corporation of Pennsylvania No Drawing. Application October 24, 1946, Serial No. 705,475

6 Claims. (Cl. 18—53)

1

This invention relates to the production of sheets from material containing a rubber. More particularly, the invention relates to a method of preparing flexible sheets having a smooth surface from material containing synthetic rubber which sheets are particularly adapted for use as floor coverings, sink tops, desk tops, wall coverings, and the like.

The production of sheet material from synthetic rubber compounds for use as floor coverings and in related fields has heretofore been handicapped in that the compounds tend to form blisters throughout the sheet during the process, many of which are visible at the surface of the material.

In order to overcome the effects resulting from the formation of such blisters which render the product unsuitable for use as a floor covering or similar material, the conventional method is to subject a sheet resulting from calendering a solid mass of synthetic rubber containing material to a cure in an hydraulic press a relatively short period of time at high temperatures. However, in some instances, products resulting from such a cure although possessing a smooth surface, are comparatively non-resilient and hence, are unsuitable for use in the fields discussed above. Furthermore, in order to obtain a smooth surface, extremely high pressures must be applied to the material during cure.

It is, accordingly, an object of this invention to provide a process of producing continuous lengths of smooth surfaced sheet material from mixtures containing synthetic rubber without resorting to high pressures during curing.

It is a further object of this invention to provide a process of making sheets from rubber-like polymers which sheets are characterized by freedom from blistering during the manufacture thereof and which are highly suitable for use as floor coverings, wall coverings, and the like.

It is a further object of this invention to provide a process of making flexible sheet materials having a smooth surface from mixtures containing synthetic rubber.

Still another object of this invention is to provide a process of manufacturing synthetic rubber sheet materials which may be carried out on existing equipment with but slight modification.

These and other objects of this invention will become apparent to those skilled in the art upon becoming familiar with the following description.

I have found that mixtures containing synthetic rubber may be subdivided into comparatively fine particles, formed into continuous sheets and thereafter cured at elevated temperatures in air at substantially atmospheric pressures to produce a resilient and lively sheet having a smooth surface which is free from blisters and which is particularly suited for use as a floor covering, wall covering, and in other related fields.

The synthetic rubbers or rubber-like polymers which may be utilized in the practice of my invention include such polymers commonly known as GR–S and Buna-S which are copolymers of butadiene and styrene; rubber-like polymers commonly known as GR–M or neoprene, a polymer of chloroprene; rubber-like polymers known as Buna-N, Perbunan and Hycar which are copolymers of butadiene and acrylonitrile. The synthetic rubbers of the type described above may be generically referred to as rubber-like polymers of diolefins. The term diolefins as employed herein is intended to embrace conjugated diolefins such as butadiene as well as substituted conjugated diolefins such as chloroprene.

In accordance with my invention, the synthetic rubber is compounded with other ingredients in suitable proportions and after compounding the mix is subjected to subdivision. The subdivided mass is then formed into continuous sheets and the resulting sheets are subjected to curing in air at elevated temperatures and at atmospheric pressure for a period of time sufficiently to effect a cure of the sheet material.

The mixtures which are subdivided in accordance with my invention include in addition to the synthetic rubber other ingredients commonly employed in rubber compounding. For example, a typical mixture would include synthetic rubber, a plasticizer, a filler, either organic or mineral, or both, a suitable vulcanizing agent and one or more activators for vulcanization.

If desired, to facilitate handling the continuous lengths the material may be formed into sheets upon a suitable carrier backing such as felt, or woven fabric, for example burlap, cotton sheeting, and the like. The invention will be more particularly described with reference to the production of a floor covering from synthetic rubber. In one modification of my invention, a suitable mixture containing synthetic rubber, for example GR–S, a vulcanizing agent such as sulphur and mineral and/or organic fillers together with vulcanization accelerators is prepared in a mixing device maintained at elevated temperatures such as 200° to 220° F. The resulting mix is then transferred to an extrusion device operated at a somewhat higher temperature such as 250° to 275° F., is extruded and cut into desired lengths. The extruded and cut material is then further subdivided into particles of suitable size which are generally such that the particles are less than ½" in the longest axis thereof. The lower limitation on particle size is determined by the ability of the mixture to retain its free flowing characteristics during the process so that the mixture will not pack into a solid mass under the conditions of the process. The minimum particle size may vary depending upon the particular composition of the mixture as well as the temperatures to which the subdivided mixture is subjected. Generally speaking, however, mixtures the bulk of the particles of which are between sieve numbers 10 and 30 on the standard screen scale have been employed to advantage. A significant quantity such as 10% of fines may be present in the mixture without affecting the processing characteristics thereof. This finely divided mass is then calendered onto a backing at elevated temperatures such as approximately 225° to 250° F.

Following the calendering of the material into a sheet, the sheet is subjected to curing in air at substantially atmospheric temperature for a time sufficient to effect a cure of the rubber-like polymer. While the conditions of cure may vary depending upon the composition of the mixture, the accelerators present therein, and the vulcanizing agent present therein, generally speaking, the sheet may be cured at temperatures of about 180° F. to 200° F. Particularly advantageous results have been obtained by curing the sheet at a temperature of approximately 190° F. The time required to effect curing of the sheet also varies depending upon composition thereof and the temperature employed. Generally speaking, complete cures may be obtained at the temperatures indicated above in from three to ten days.

In another embodiment of my invention, the finely divided mass containing synthetic rubber may be formed into a sheet by the application of sufficient heat and pressure to form a layer of material. The temperature and pressure required to obtain a sheet in this manner may vary, but, generally speaking, a press operated at temperatures such as 240° F. and at pressures such as 1500#/sq. in. results in the formation of a layer or sheet from the finely divided material. This pressure is applied only for a sufficient length of time to compact the material into a solid mass and imparts no vulcanization or curing to the sheet. Thus a comparatively short pressure period such as 15 seconds is employed. After removal from the press, the sheet may then be air cured in the manner indicated above to obtain a smooth surfaced sheet suitable for use as a flooring. This embodiment of my invention permits the manufacture of a large number of designs in that there is less limitation as to patterns as is the case with the manufacture of calendered goods.

While the mixtures from which sheet materials are prepared in accordance with this invention may contain either mineral or organic fillers particularly advantageous results may generally be obtained by the incorporation of a relatively large particle size organic filler in the mix. Examples of such organic fillers are wood flour, cork, and the like, and the incorporation of such fillers produces a superior surface on the sheet material. In the manufacture of flooring, 60 mesh to dust wood flour and 50 mesh to dust cork particles have been advantageously employed.

Typical of the compositions from which sheet material may be prepared in accordance with my invention are the following:

*Example I*

| Ingredient: | Parts by weight |
|---|---|
| GR-S | 100 |
| Plasticizer | 2 |
| Softener | 10 |
| Whiting | 120 |
| Wood flour | 60 |
| Sulfur | 30 |
| Zinc oxide | 5 |
| Stearic acid | 1 |
| "Accel. 808" (butyraldehyde-aniline condensation product) | 1 |
| "Tuads" (tetramethyl thiuram disulfide) | 1 |
| Water | 2 |
| Diethylene glycol | 1 |

*Example II*

| Ingredient: | Parts by weight |
|---|---|
| Neoprene | 100 |
| Plasticizer | 1 |
| Softener | 17.5 |
| Light MgO | 4 |
| Zinc oxide | 10 |
| Cork | 40 |
| Whiting | 100 |
| Clay | 100 |
| Color | 33.7 |

*Example III*

| Ingredient: | Parts by weight |
|---|---|
| GR-S | 100 |
| Plasticizer | 1 |
| Softener | 21 |
| Clay | 60 |
| Whiting | 250 |
| Sulfur | 22.5 |
| Zinc oxide | 5 |
| Stearic acid | 1 |
| Water | 2 |
| Diethylene glycol | 1 |
| Color | 36.5 |
| Accelerator | 1.3 |

As indicated above, the other ingredients compounded with the rubber are those generally used in the rubber compounding art. For instance, suitable plasticizers include light oils and the like. Such materials as light mineral oils, pitches, fatty acids, and the like may be used either alone or in admixture as softeners. All of these materials and their purpose are well known in the art of rubber compounding as well as the proportions which may be employed.

Sheet materials prepared in accordance with this invention are characterized by extremely smooth surfaces and are free from blisters or other defects. The products in addition to possessing these characteristics are resilient and lively and are particularly suitable for use in the floor covering and related fields. The invention may be practiced on existing equipment utilized for the manufacture of floor covering with comparatively little modification and heavy gauges of sheet material such as .050 to .250 inch may be produced.

In that embodiment of my invention involving the calendering of the material into a sheet, a two roll calender may be used and the finely divided mass may be calendered to the desired gauge and deposited upon the backing at the same pass through the calender. If desired, the finely divided mass may be sheeted by means of a three roll calender. When such a calender is employed, the mass is calendered to gauge by passage between the first and second rolls, and is deposited on the backing by passage between the second and third rolls.

The products obtained in accordance with my invention are characterized by good wear resistance, resistance to alkali and generally exhibit resistance to oil and greases in view of the presence of synthetic rubber in the composition. The method permits the production of materials having various colors in that coloring matter may be readily incorporated in the mix prior to the formation of a sheet therefrom.

The fine subdivision of the particles of the mass prior to sheeting prevents the formation of blisters in the final product in that there is no opportunity for the mass to entrap large quantities of air, which during the cure result in the formation of blisters, many of which are visible on the surface of the material. Thus my invention enables curing immediately after forming the mass into a sheet.

While the invention has been described with particular reference to the production of sheet material from synthetic rubber, it may also be employed in the production of sheet material from natural rubber. In the specification and claims, the term "a rubber" is intended to include the various types and grades of natural rubber as well as synthetic rubber.

Although, throughout the specification and in the claims, mention has been made of smooth surfaced material, it is not intended to exclude from the scope of this invention the manufacture of material provided with ribs or other such surface effects. For instance, a sheet may be provided with ribs to provide a flooring suitable for use in buses, trolley cars, and the like where the requirements for traction are high.

While the invention has been described with reference to particular embodiments and with reference to certain specific examples, it is to be understood that the invention is not limited thereby. Therefore, changes, omissions, substitutions and/or additions may be made without departing from the spirit of the invention as defined in the appended claims which are intended to be limited only as required by the prior art.

I claim:

1. A process of preparing flexible, smooth surfaced sheets containing a rubber which comprises forming a rubber compound, including an unvulcanized rubber, a plasticizer, a filler, a vulcanizing agent, and an activator for vulcanization, in a mixing zone maintained at elevated temperature, extruding the resulting plastic mass at a higher temperature, cutting the extruded material, subdividing the extruded and cut material into particles the bulk of which are between sieve numbers 10 and 30 on the standard screen scale, forming a sheet from said particles, and curing said sheet in air at a temperature of approximately 180° F. to 200° F. and at substantially atmospheric pressure.

2. A process of preparing flexible, smooth surfaced sheets from a synthetic rubber compound, including an unvulcanized synthetic rubber, a plasticizer, a filler, a vulcanizing agent, and an activator for vulcanization, in a mixing zone maintained at a temperature between about 200° F. and 220° F. to produce a plastic blended compound, extruding the plastic blended compound at a temperature between about 250° F. and 275° F., cutting the extruded material into a predetermined length, further subdividing the extruded and cut material into particles the bulk of which are between sieve numbers 10 and 30 on the standard screen scale, calendering the resulting subdivided material into a continuous sheet at a temperature from about 225° F. to 250° F., and heating the resulting calendered material in air at substantially atmospheric pressure to a temperature of approximately 180° F. to 200° F. for about three to ten days.

3. A process of preparing flexible, smooth surfaced sheets from a rubberlike polymer of a diolefin which comprises forming a compounded plastic mass, including an unvulcanized polymer, a plasticizer, a filler, a vulcanizing agent, and an activator for vulcanizaton, by mixing said ingredients at a temperature between about 200° F. and 220° F., extruding the resulting plastic mass at a temperature between 250° F. and 275° F., cutting the extruded material into predetermined lengths, further subdividing said extruded and cut material into particles the bulk of which are between sieve numbers 10 and 30 on the standard screen scale, calendering said subdivided material into a sheet at a temperature of approximately 225° F. to 250° F., and heating said sheet in air at substantially atmospheric pressure at a temperature of approximately 180° F. to 200° F. to effect curing.

4. A process of preparing flexible, smooth surfaced sheets from a rubberlike copolymer of butadiene and styrene which comprises forming a completely plastic mass, including an unvulcanized copolymer, a plasticizer, a filler, a vulcanizing agent, and an activator for vulcanization, by mixing said ingredients at a temperature between about 200° F. and 220° F., extruding the resulting plastic mass at a temperature between 250° F. and 275° F., cutting the extruded material into predetermined lengths, further subdividing said extruded and cut material into particles, the bulk of which are between sieve numbers 10 and 30 on the standard screen scale, calendering said subdivided material into a sheet at a temperature of approximately 225° F. to 250° F., and heating said sheet in air at substantially atmospheric pressure at a temperature of approximately 180° F. to 200° F. to effect curing.

5. A process of preparing flexible, smooth surfaced sheets from a rubberlike copolymer of butadiene and acrylonitrile which comprises forming a compounded plastic mass, including an unvulcanized copolymer, a plasticizer, a filler, a vulcanizing agent, and an activator for vulcanization, by mixing said ingredients at a temperature between about 200° F. and 220° F., extruding the resulting plastic mass at a temperature between 250° F. and 275° F., cutting the extruded material into predetermined lengths, further subdividing said extruded and cut material into particles the bulk of which are between sieve numbers 10 and 30 on the standard screen scale, calendering said subdivided material into a sheet at a temperature of approximately 225° F. to 250° F., and heating said sheet in air at substantially atmospheric pressure at a temperature of approximately 180° F. to 200° F. to effect curing.

6. A process of preparing flexible, smooth surfaced sheets from a rubberlike polymer of chloroprene which comprises forming a compounded plastic mass, including an unvulcanized polymer, a plasticizer, a filler, a vulcanizing agent, and an activator for vulcanization, by mixing said ingredients at a temperature between about 200°

F. and 220° F., extruding the resulting plastic mass at a temperature between 250° F. and 275° F., cutting the extruded material into predetermined lengths, further subdividing said extruded and cut material into particles the bulk of which are between sieve numbers 10 and 30 on the standard screen scale, calendering said subdivided material into a sheet at a temperature of approximately 225° F. to 250° F., and heating said sheet in air at substantially atmospheric pressure at a temperature of approximately 180° F. to 200° F. to effect curing.

BRUCE R. BILLMEYER.

REFERENCES CITED

The following references are of record in the file of this patent:

UNITED STATES PATENTS

| Number | Name | Date |
|---|---|---|
| 986,162 | Gare | Mar. 7, 1911 |
| 1,427,754 | Gibbons | Aug. 29, 1922 |
| 1,605,572 | Stedman | Nov. 2, 1926 |
| 2,087,942 | West | July 27, 1937 |

OTHER REFERENCES

Gottlob, Technology of Rubber, Maclaren and Sons, Ltd., London, 1927, page 209.